(12) United States Patent
Nicolas et al.

(10) Patent No.: US 12,135,672 B2
(45) Date of Patent: Nov. 5, 2024

(54) SYSTEMS AND METHODS FOR A SECURED COMMUNICATION BETWEEN COMPUTERS AND PERIPHERAL DEVICES

(71) Applicant: Vertiv IT Systems, Inc., Hunstville, AL (US)

(72) Inventors: Mark A. Nicolas, Owens Cross Roads, AL (US); Albert Cohen, Las Vegas, NV (US)

(73) Assignee: Vertiv IT Systems, Inc., Huntsville, AL (US)

( * ) Notice: Subject to any disclaimer, the term of this patent is extended or adjusted under 35 U.S.C. 154(b) by 78 days.

(21) Appl. No.: 17/945,248

(22) Filed: Sep. 15, 2022

(65) Prior Publication Data

US 2023/0089347 A1   Mar. 23, 2023

Related U.S. Application Data

(60) Provisional application No. 63/245,501, filed on Sep. 17, 2021.

(51) Int. Cl.
*G06F 13/42* (2006.01)
(52) U.S. Cl.
CPC .. *G06F 13/4282* (2013.01); *G06F 2213/0042* (2013.01)
(58) Field of Classification Search
CPC ............... G06F 13/4282; G06F 2213/0042
See application file for complete search history.

(56) References Cited

U.S. PATENT DOCUMENTS

| 2007/0233906 | A1* | 10/2007 | Tatum | G06F 13/28 |
| | | | | 710/26 |
| 2008/0259929 | A1 | 10/2008 | Mraz | |
| 2009/0033668 | A1* | 2/2009 | Pederson | G09G 5/006 |
| | | | | 345/520 |
| 2015/0356050 | A1 | 12/2015 | Smith | |
| 2016/0203343 | A1 | 7/2016 | Soffer | |
| 2020/0057508 | A1* | 2/2020 | Menachem | G06F 3/023 |
| 2020/0322568 | A1* | 10/2020 | Rahmany | H04N 7/015 |

OTHER PUBLICATIONS

International Search Report and Written Opinion for International Application No. PCT/US2022/043623 mailed Dec. 12, 2022.

* cited by examiner

*Primary Examiner* — Henry Tsai
*Assistant Examiner* — Harry Z Wang
(74) *Attorney, Agent, or Firm* — Suiter Swantz IP

(57) ABSTRACT

A system for a secured communication between a computer and peripheral devices includes a fiber isolator transmitter coupled to a computer and one or more fiber-optic pairs; a fiber isolator receiver coupled to one or more peripheral devices and the one or more fiber-optic pairs; and the one or more fiber-optic pairs configured to transfer optical data signals between the fiber isolator transmitter and the fiber isolator receiver. The fiber isolator transmitter and the fiber isolator receiver are configured so corresponding video data and audio data flows from the computer to a corresponding display device(s) and/or speaker(s), respectively, of the one or more peripheral devices via one optical fiber of a corresponding fiber optic pair of the one or more fiber-optic pairs and USB data flow from the one or more peripheral devices to the corresponding computer via a particular optical fiber of the one or more fiber optic pairs.

18 Claims, 10 Drawing Sheets

SYSTEMS AND METHODS FOR A SECURED COMMUNICATION BETWEEN COMPUTERS AND PERIPHERAL DEVICES

CROSS REFERENCE TO RELATED APPLICATION

The present application claims priority from U.S. provisional application Ser. No. 63/245,501, filed Sep. 17, 2021, the disclosure of which is hereby incorporated by reference in its entirety into the present disclosure.

TECHNICAL FIELD

This invention relates generally to a secured communication between computers and peripheral devices.

BACKGROUND

Generally, a computer may be directly connected to one or more peripheral devices. However, there is a need to have a secure connection between a computer to one or more peripheral devices.

BRIEF DESCRIPTION OF THE DRAWINGS

Disclosed herein are embodiments of systems, apparatuses and methods pertaining to a secured communication between computers and peripheral devices. This description includes drawings, wherein.

Figure 1:
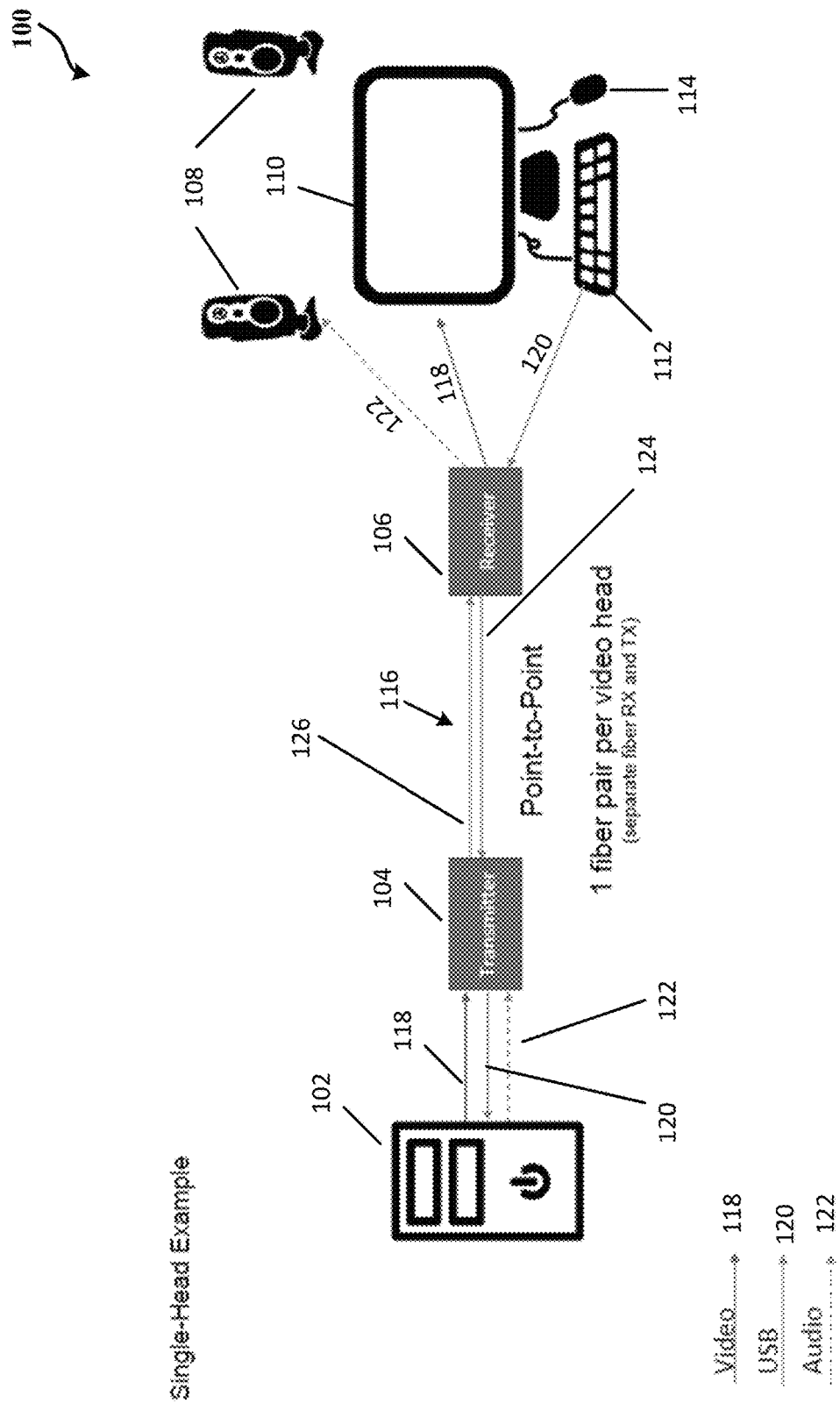
FIG. 1 illustrates an example system for a secured communication between a single-head computer and one or more peripheral devices in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for securing communication between computers and peripheral devices. In some embodiments, a system for a secured communication between a computer and peripheral devices includes a fiber isolator transmitter correspondingly coupled to a computer and one or more fiber-optic pairs. The system may include a fiber isolator receiver correspondingly coupled to one or more peripheral devices and the one or more fiber-optic pairs. The one or more fiber-optic pairs may transfer optical data signals between the fiber isolator transmitter and the fiber isolator receiver. The fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs.

In some embodiments, a fiber isolator transmitter for a secured communication between a computer and peripheral devices includes an extended display identification data (EDID) emulator receiving video data from a computer and sending to a data packetizer. The fiber isolator transmitter may include an audio serializer receiving an audio data from the computer and outputting a serialized audio data to the data packetizer. The fiber isolator transmitter may include the data packetizer. The data packetizer may receive the video data and the serialized audio data. In some embodiments, the data packetizer transforms the video data and the serialized audio data into corresponding electronic data packets. In some embodiments, the data packetizer outputs the corresponding electronic data packets associated with the video data and the serialized audio data to a fiber transceiver. The fiber isolator transmitter may include the fiber transceiver receiving and converting the corresponding electronic data packets into an optical data signal. In some embodiments, the fiber transceiver outputs the optical data signal to a first optical fiber of a fiber-optic pair.

In some embodiments, the EDID may be transmitted from a display device. In some embodiments, the video may be transmitted from a computer. In some configurations, the fiber isolator receiver may read the EDID from the display device and send the EDID information to the fiber isolator transmitter to store in the EDID emulator. In some embodiments, the fiber isolator transmitter's EDID emulator provides EDID information whenever the computer requests it. In some embodiments, the computer outputs video to the fiber isolator transmitter and the fiber isolator transmitter's packetizer transforms the video to electronic data packets, which are sent to the transceiver for transmission over the fiber. In some embodiments, the fiber isolator receiver's transceiver receives the electronic data packets and sends the electronic data packets to the packetizer to transform to video data. The video data may be outputted to a connected display device.

In some embodiments, a fiber isolator receiver for a secured communication between a computer and peripheral devices includes a fiber transceiver receiving an optical data signal from a first optical fiber of a fiber-optic pair. The fiber transceiver may convert the optical data signal into corresponding electronic data packets and output the corresponding electronic data packets to a data packetizer. In some embodiments, the fiber isolator receiver includes the data packetizer receiving and transforming the corresponding electronic data packets into video data and audio data. The data packetizer may output the video data and the audio data. In some embodiments, the fiber isolator receiver includes an extended display identification data (EDID) emulator that receives the video data from the data packetizer and outputs a video data to a corresponding display device. For example, video may be one-to-one, in that each video head or video stream from a computer goes to only one display device coupled to a fiber isolator receiver in order to provide a secure separation of communication to ensure video data from one video head or video stream cannot leak to another video display device. In some embodiments, the fiber isolator receiver includes an audio deserializer that receives the serialized audio data from the data packetizer and outputs a deserialized audio data to one set of speakers. In some embodiments, a method for a secured communication between a computer and peripheral devices includes configuring a fiber isolator transmitter to correspondingly couple to a computer and one or more fiber-optic pairs. The method may include configuring a fiber isolator receiver to correspondingly couple to one or more peripheral devices and the one or more fiber-optic pairs. The fiber isolator transmitter and the fiber isolator receiver are configured such that a corresponding video data flows from the computer to a corresponding display device via an optical fiber of a corresponding fiber optic pair of the one or more fiber-optic pairs.

Figure 2:
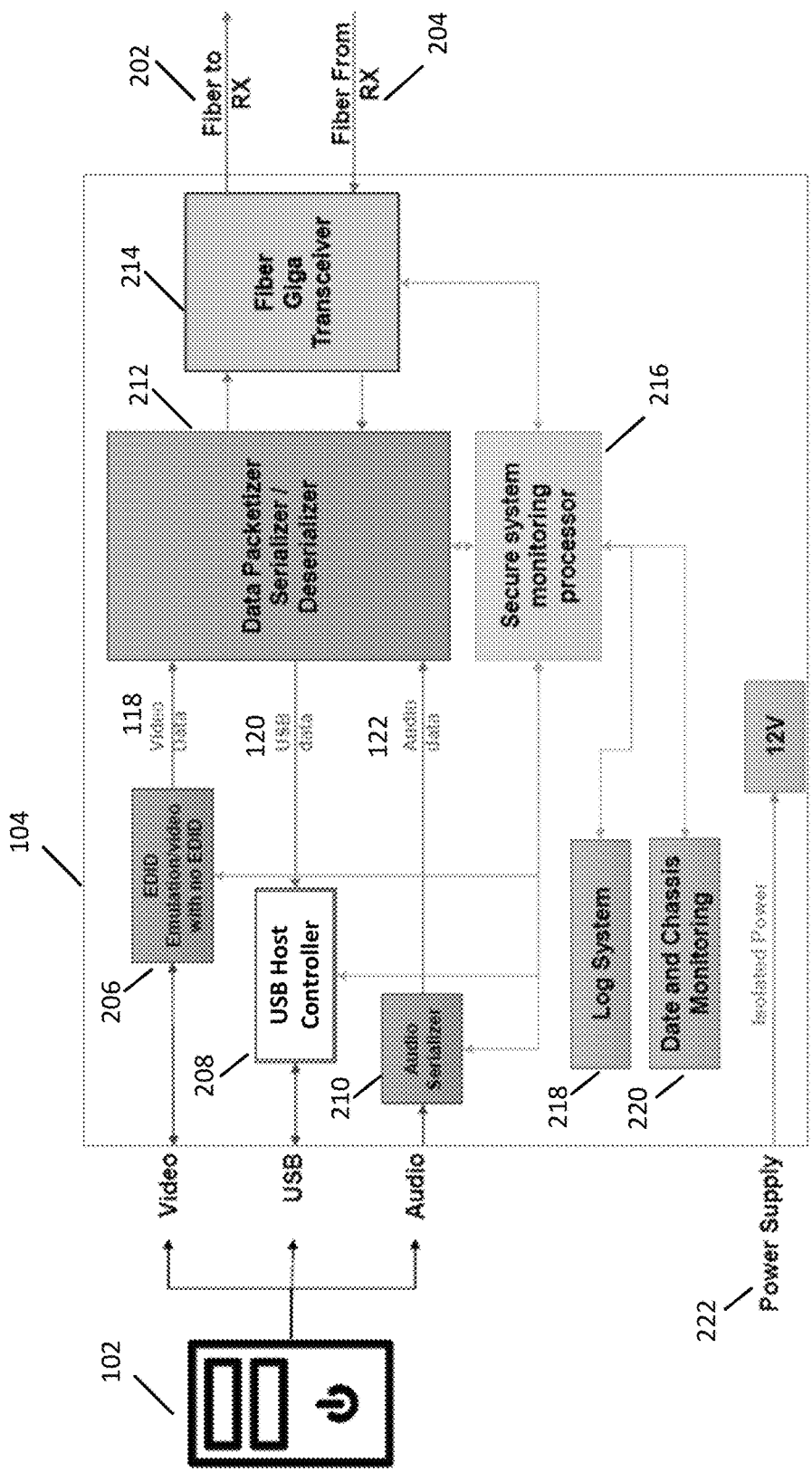
FIG. 2 is a block diagram of an example single-head fiber isolator transmitter of FIG. 1.
Figure 3:
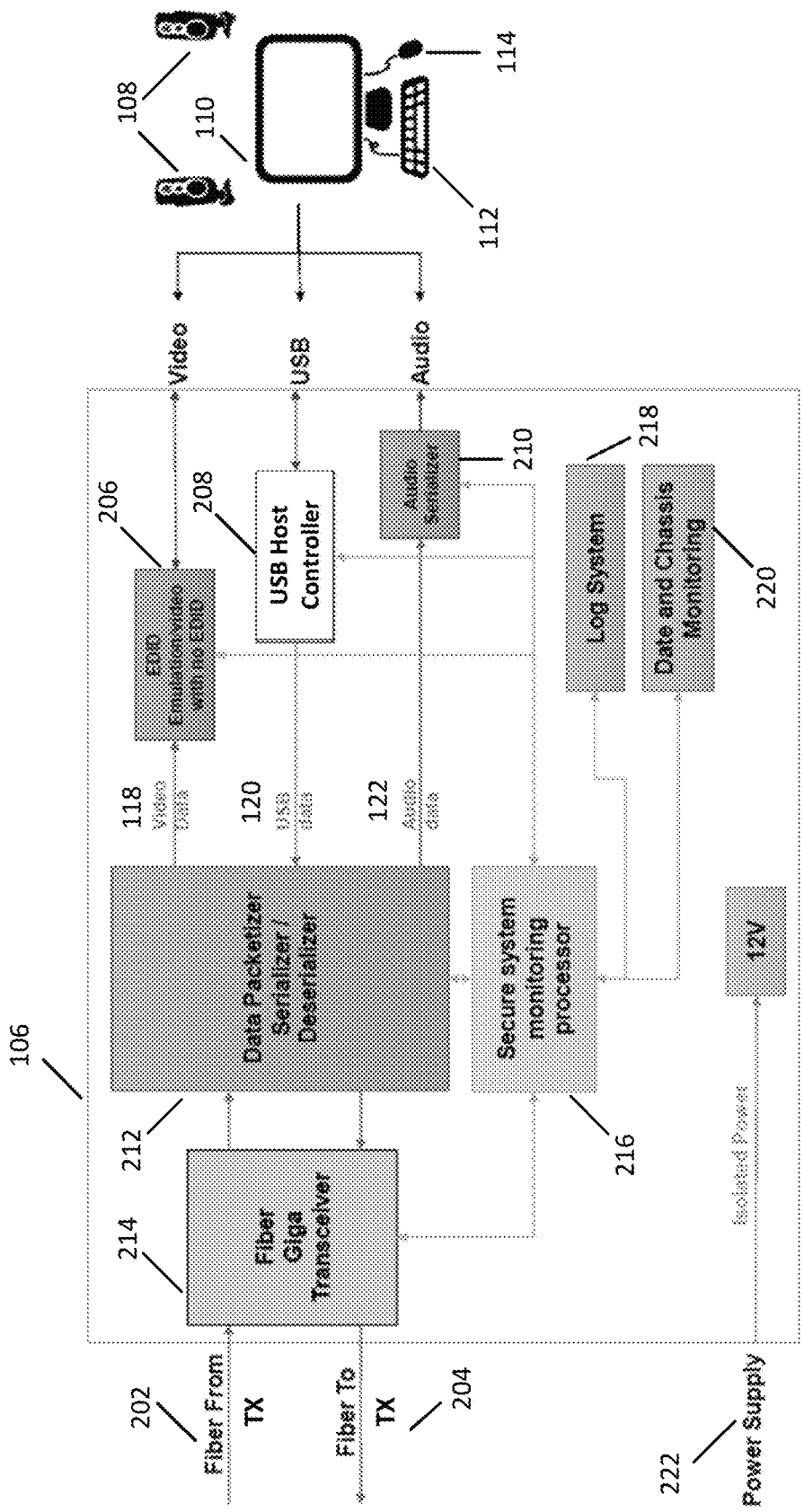
FIG. 3 is a block diagram of an example single-head fiber isolator receiver of FIG. 1.

FIGS. 1-3 illustrate a single-head secure fiber isolator system 100. FIG. 1 illustrates an example system 100 for a secured communication between a computer 102 and one or more peripheral devices in accordance with some embodiments. In some embodiments, a computer 102 includes a server, a desktop, a laptop, a thin client, to name a few. The system 100 includes the computer 102, a fiber isolator transmitter 104, a fiber isolator receiver 106, and/or the one or more peripheral devices. In some embodiments, the computer 102 is paired to one set of peripheral devices (e.g., one set of stereo speakers or headphones). In some embodiments, the one or more peripheral devices include a set of speakers (or headphones) 108, a display device 110 (e.g., a monitor and/or any electronic device capable of displaying video stream and/or images), a computer mouse (or a point device) 114, and/or a keyboard 112. For example, in FIG. 1, the computer 102 is paired with only one display device (single head), only one mouse/point device, only one keyboard, and only one fiber-optic pair. In some embodiments, the fiber isolator transmitter 104 is coupled to the fiber isolator receiver 106 via one fiber-optic pair 116. In some embodiments, optical data signals associated with a USB data 120 are transferred from the fiber isolator receiver 106 to the fiber isolator transmitter 104 via a particular fiber optic cable 124 in the fiber-optic pair 116. The other fiber optic cable 126 of the fiber-optic pair 116 is configured to transfer video data 118 and audio data 122 from the fiber transmitter 104 to the fiber isolator receiver 106. As such, in the system 100, a first fiber optic cable of the fiber-optic pair 116 only transfers the USB data 120 while the second fiber optic cable of the fiber-optic pair 116 is configured to only transfer video data 118 and the audio data 122. In one example, an optical data signal corresponding to a video data 118 and/or an audio data 122 may be transferred over a first optical fiber of the single fiber-optic pair 116. In another example, an optical data signal corresponding to a universal serial bus (USB) data is transferred over a second optical fiber of the single fiber-optic pair 116. As shown in FIG. 1, the fiber isolator transmitter 104 and the fiber isolator receiver 106 are configured such that a corresponding video data 118 and/or audio data 122 flows from the computer 102 to a corresponding display device 110 and/or speaker device or speaker 108, respectively, of the one or more peripheral devices via the first optical fiber of a single fiber-optic pair 116. Furthermore, the USB data 120 flow from the keyboard 112 and computer mouse 114 to computer 102 via the second optical fiber of a single fiber optic pair.

Referring now to the fiber isolator transmitter 104, FIG. 2 illustrates a block diagram of an example single-head fiber isolator transmitter 104 of FIG. 1. In some embodiments, one or more elements/components shown in FIG. 2 may correspond to one or more elements/components shown in FIG. 1.

In some embodiments, the fiber isolator transmitter 104 includes an extended display identification data (EDID) emulator 206. The EDID emulator 206 may receive the EDID information of display device 110 from the secure system monitoring processor 216. The EDID emulator 206 provides the EDID information when requested by a computer 102 to ensure the computer's video output resolution is compatible with display device 110. The EDID emulator 206 may include a microcontroller with a I2C interface to provide the EDID information when requested by the computer 102. In some embodiments, the fiber isolator transmitter 104 may include an audio serializer 210 that receives analog audio data from the computer 102. The audio serializer 210 outputs serialized audio data 122 to the data packetizer 212. For example, the audio serializer 210 may correspond to an audio encoder/decoder, an audio encoder/serializer and/or audio decoder/deserializer. In some embodiments, the data packetizer 212 receives the video data and/or the serialized audio data and transforms the video data and/or the serialized audio data into corresponding electronic data packets. By one approach, the data packetizer 212 may output the corresponding electronic data packets to a fiber transceiver 214. In some embodiments, the data packetizer 212 includes system on a chip (SOC) with internal video compression and encoding. Additionally, the fiber isolator transmitter 104 includes the fiber transceiver 214 that receives and converts the corresponding electronic data packets into an optical data signal. The fiber transceiver 214 outputs the optical data signal to a first optical fiber 202 of a fiber-optic pair. The optical data signal may include data corresponding to the video data 118 and/or the audio data 122.

In some embodiments, the fiber transceiver 214 receives an optical data signal via a second optical fiber 204 of the fiber-optic pair. By one approach, the received optical data signal may include data corresponding to a USB data 120. In some embodiments, the USB data 120 is outputted by a computer mouse 114 and/or a keyboard 112. In some embodiments, the fiber transceiver 214 may transform the received optical data signal into a corresponding electronic data packet of the USB data 120. The fiber transceiver 214 may output the corresponding electronic data packet to the data packetizer 212. In some embodiments, the data packetizer 212 transforms the received electronic data packet into the USB data 120 and outputs to a USB emulator 208. The USB emulator 208 may receive the USB data 120 and output an emulated USB data to the computer 102. For example, the USB emulator 208 may correspond to a USB device emulator to maintain the USB interface between the computer 102 and the fiber isolator transmitter 104. The USB emulator may emulate a generic USB HID (Human Interface Device) keyboard and/or mouse to the computer 102. The USB data 120 that is passed from the receiver to the transmitter may, for example, correspond to the keyboard key presses/releases and/or mouse movement/clicks.

In some embodiments, the fiber isolator transmitter 104 includes a secure system monitoring processor 216, a log system 218, and/or a data and chassis monitoring 220. The secure system monitoring processor 216 is coupled to the log system 218 and/or the data and chassis monitoring 220. The secure system monitoring processor 216 ensures that operation of the fiber isolator transmitter 104 is secured and/or has not been compromised and/or tampered with. By one approach, the secure system monitoring processor 216 may determine whether the transmission of the video data 118 and/or the audio data 122 is only in a direction towards a fiber output port of the fiber isolator transmitter 104 coupled to the first optical fiber 202. By another approach, the secure system monitoring processor 216 may determine whether the transmission of the USB data 120 is only in a direction towards a USB port coupled to the computer 102. In some embodiments, in a determination by the secure system monitoring processor 216 that the direction of the transmission of the video data 118 and/or the audio data 122 is not towards the fiber output port and/or the USB data 120 is not towards the computer 102, the secure system monitoring processor 216 may cause the fiber isolator transmitter 104 to be inoperative and/or provide an alert indicating that the fiber isolator transmitter 104 is not secure and/or that the operation has been compromised.

In some embodiments, the log system 218 stores activity logs corresponding to powering on and/or off of the fiber isolator transmitter 104, activation and/or deactivation of operation of the fiber isolator transmitter 104, coupling and/or decoupling of the fiber isolator transmitter 104 to a power supply 222. In some embodiments, the power supply 222 includes a 12 volt power supply and/or any power supply rating that may be in cooperation with another electrical component (e.g., power supply converter) capable of providing power to the fiber isolator transmitter 104. In some embodiments, the data and chassis monitoring 220 in cooperation with one or more mechanical and/or electrical sensors and/or switches determines whether a housing of the fiber isolator transmitter 104 has been tampered with and/or accessed. In a determination that the housing has been tampered with and/or accessed, the secure system monitoring processor 216, for example, will cause the fiber isolator transmitter 104 to be permanently inoperative and provide an alert indicating that the fiber isolator transmitter 104 has been tampered with and/or accessed.

Referring now to the fiber isolator receiver 106, FIG. 3 illustrates a block diagram of an example single-head fiber isolator receiver 106 of FIG. 1. In some embodiments, the fiber isolator receiver 106 includes a fiber transceiver 214. The fiber transceiver 214 may receive an optical data signal corresponding to a video data 118 and/or an audio data 122 via a first optical fiber 202 of a fiber-optic pair. The fiber transceiver 214 may convert the optical data signal into corresponding electronic data packets and output the corresponding electronic data packets to a data packetizer 212. In some embodiments, the fiber isolator receiver 106 includes the data packetizer 212. The data packetizer 212 may receive and transform the corresponding electronic data packets into video data 118 and/or audio data 122, output the video data 118 to an extended display identification data (EDID) emulator 206, and output the audio data 122 to an audio serializer 210. In some embodiments, the EDID emulator 206 receives the video data 118 from the data packetizer 212 and outputs the video data 118 to a corresponding display device 110 of one display devices. In some embodiments, the audio serializer 210 receives the serialized audio data 122 from the data packetizer 212 and outputs the analog audio data 122 to one set of speakers 108.

In some embodiments, the fiber isolator receiver 106 includes a universal serial bus (USB) host controller (or USB emulator) 208. The USB host controller 208 may receive USB data 120 from a USB device (e.g., computer mouse 114 and/or keyboard 112) of the one or more peripheral devices and output USB data 120 to the data packetizer 212. The data packetizer 212 may receive and transform the USB data 120 into a second corresponding electronic data packet and output the second corresponding electronic data packet to the fiber transceiver 214. The fiber transceiver 214 converts the second corresponding electronic data packet into a second optical data signal and output the second optical data signal to a second optical fiber 204 of the fiber-optic pair.

In some embodiments, the fiber isolator receiver 106 includes a secure system monitoring processor 216, a log system 218, and/or a data and chassis monitoring 220. The secure system monitoring processor 216 is coupled to the log system 218 and/or the data and chassis monitoring 220. The secure system monitoring processor 216 ensures that operation of the fiber isolator receiver 106 is secured and/or has not been compromised and/or tampered with. In some embodiments, the secure system monitoring processor 216 may determine whether the transmission of the video data 118 is only in a direction towards a video output port of the fiber isolator receiver 106. In some embodiments, the secure system monitoring processor 216 may determine whether the transmission of the audio data 122 is only in a direction towards an audio output port of the fiber isolator receiver 106. In yet more embodiments, the secure system monitoring processor 216 may determine whether the transmission of the USB data 120 is in a direction towards a fiber output port of the fiber isolator receiver 106 coupled to the second optical fiber 204. In some embodiments, in a determination by the secure system monitoring processor 216 that the direction of the transmission of the video data 118 and/or the audio data 122 is not towards the video output port and/or audio output port, respectively, and/or that the direction of the transmission of the USB data 120 is not towards the fiber output port, the secure system monitoring processor 216 may cause the fiber isolator receiver 106 to be inoperative and/or provide an alert indicating that the fiber isolator receiver 106 is not secure and/or that the operation has been compromised.

In some embodiments, the log system 218 stores activity logs corresponding to powering on and/or off of the fiber isolator receiver 106, activation and/or deactivation of operation of the fiber isolator receiver 106, coupling and/or decoupling of the fiber isolator receiver 106 to a power supply 222. In some embodiments, the power supply 222 includes a 12 volt power supply and/or any power supply rating that may be in cooperation with another electrical component (e.g., power supply converter) capable of providing power to the fiber isolator receiver 106. In some embodiments, the data and chassis monitoring 220 in cooperation with one or more mechanical and/or electrical sensors and/or switches determines whether a housing of the fiber isolator receiver 106 has been tampered with and/or accessed. In a determination that the housing has been tampered with and/or accessed, the secure system monitoring processor 216 will cause the fiber isolator receiver 106 to be permanently inoperative and provide an alert indicating that the fiber isolator receiver 106 has been tampered with and/or accessed.

Figure 4:
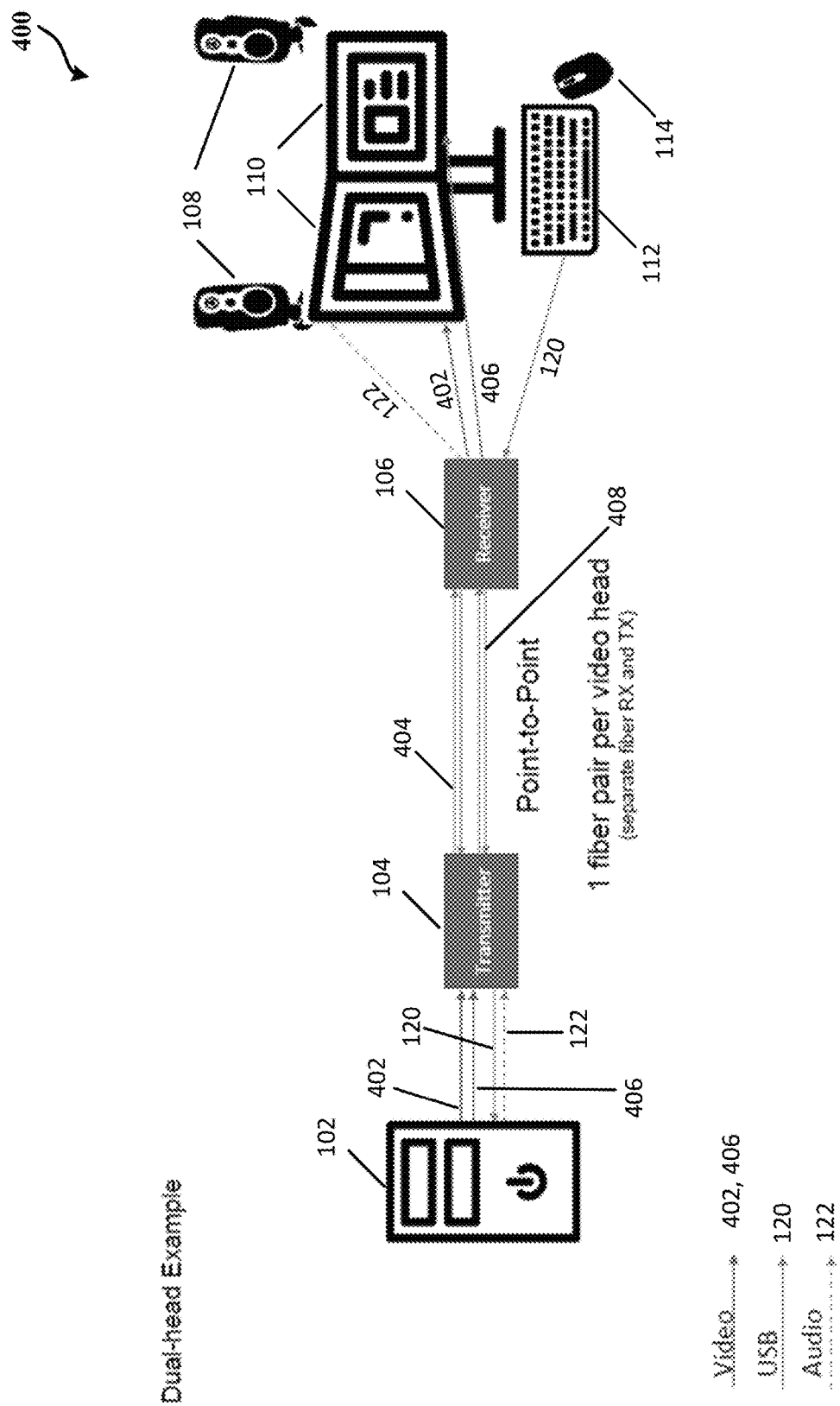
FIG. 4 illustrates an example system for a secured communication between a dual-head computer and one or more peripheral devices in accordance with some embodiments.
Figure 5:
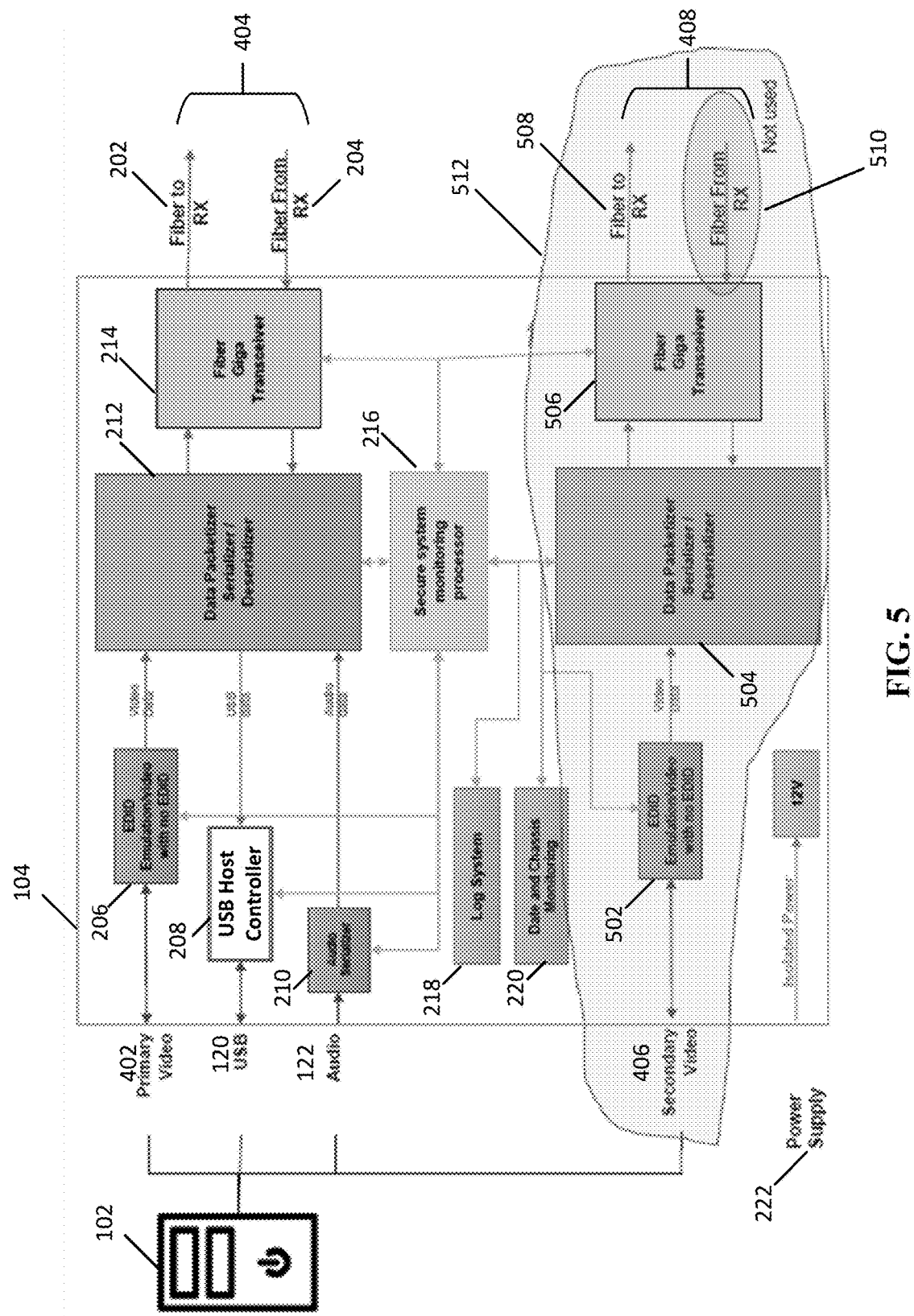
FIG. 5 is a block diagram of an example dual-head fiber isolator transmitter of FIG. 4.
Figure 6:
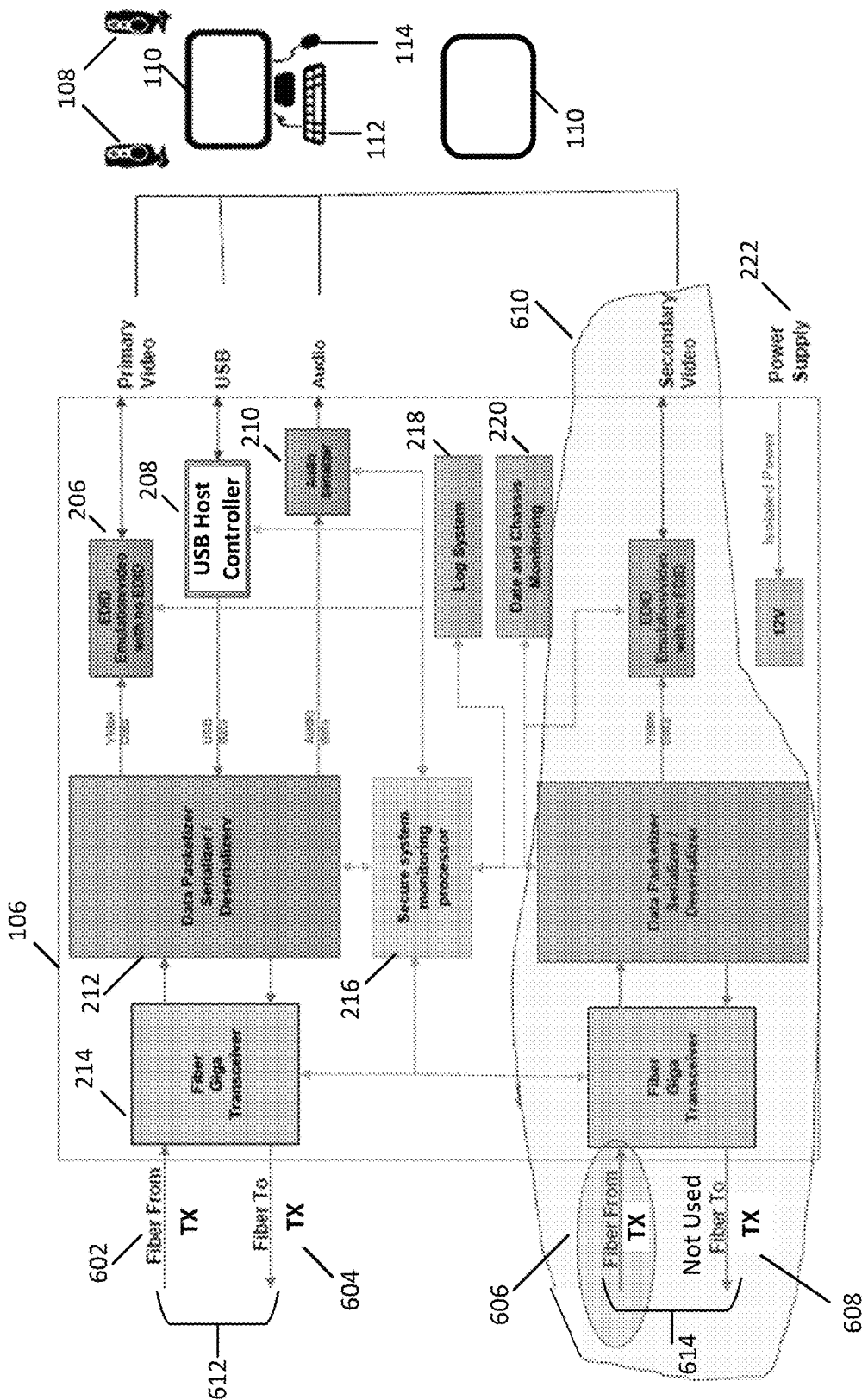
FIG. 6 is a block diagram of an example dual-head fiber isolator receiver of FIG. 4.

FIGS. 4-6 illustrate a dual-head secure fiber isolator system 400. FIG. 4 illustrates an example system 400 for a secured communication between a dual-head computer and one or more peripheral devices in accordance with some embodiments. FIG. 5 is a block diagram of an example dual-head fiber isolator transmitter 104 of FIG. 4. FIG. 6 is a block diagram of an example dual-head fiber isolator receiver 106 of FIG. 4.

The system 400 includes a computer 102, a fiber isolator transmitter 104, a fiber isolator receiver 106, and/or one or more peripheral devices (e.g., speaker 108, display device/s 110, computer mouse 114, and/or keyboard 112). In some embodiments, the fiber isolator transmitter 104 is coupled to the fiber isolator receiver 106 via one or more fiber-optic pairs 404, 408. The one or more fiber-optic pairs 404, 408 may transfer optical data signals between the fiber isolator transmitter 104 and the fiber isolator receiver 106. The optical data signals may include a first video data 402, a second video data 406, USB data 120, and/or audio data 122.

In the system 400 of FIG. 4, an optical data signal corresponding to the first video data 402 and/or the audio data 122 is transferred over a first optical fiber of a first fiber-optic pair 404. In some embodiments, the USB data 120 is transferred over a second optical fiber of the first fiber-optic pair 404. In some embodiments, an optical data signal corresponding to the second video data 406 is transferred over a second optical fiber of a second fiber-optic pair 408. In some embodiments, a fiber isolator system described herein only allows the USB data 120 and/or audio data 122 to be transferred over a single or a particular fiber-optic pair. In such an embodiment, other fiber-optic pairs other than the particular fiber-optic pair of the one or more fiber-optic pairs coupled between the fiber isolator transmitter 104 and the fiber isolator receiver 106 are configured to only transfer video data.

In an illustrative non-limiting example shown in FIG. 5, the computer 102 outputs the first video data 402 to the fiber isolator transmitter 104. In some embodiments, the computer 102 outputs the audio data 122 to the fiber isolator transmitter 104. By one approach, an extended display identification data (EDID) emulator 206 may receive the first video data 402 and outputs a first video data to a data packetizer 212. By another approach, an audio serializer 210 may receive the analog audio data 122 and outputs a serialized audio data to the data packetizer 212. In some embodiments, the data packetizer 212 transforms the emulated first video data and/or the serialized audio data into corresponding electronic data packets. The data packetizer 212 may output the corresponding electronic data packets to the fiber transceiver 214. The fiber transceiver 214 may convert the corresponding electronic data packets into optical data signal that is output to a first optical fiber 202 of a first fiber-optic pair 404.

In some embodiments, the fiber transceiver 214 receives an optical data signal via a second optical fiber 204 of the first fiber-optic pair 404. The optical data signal received via the second optical fiber 204 may include data corresponding to the USB data 120. The fiber transceiver 214 may convert the optical data signal into a corresponding electronic data packet and output to the data packetizer 212. In some embodiments, the data packetizer 212 transforms the corresponding electronic data packet to the USB data 120 and outputs the USB data 120 to a universal serial bus (USB) emulator 208. In some embodiments, the USB emulator 208 outputs an emulated USB data to the computer 102.

In the dual-head secure fiber isolator system 400, a second video data 406 is output to the fiber isolator transmitter 104 from the computer 102. In some embodiments, a second EDID emulator 502 may receive the second video data 406. The second EDID emulator 502 may output a second video data associated with the second video data 406 to a second data packetizer 504. The second data packetizer 504 may receive and transform the second video data into a second electronic data packet. The second data packetizer 504 may output the second electronic data packet to a second fiber transceiver 506. In some embodiments, the second fiber transceiver 506 receives and converts the second electronic data packet into a second optical data signal. In some embodiments, the second fiber transceiver 506 outputs the second data optical signal to a third optical fiber 508 of a second fiber-optic pair 408. In some embodiments, a fourth optical fiber 510 of the second fiber-optic pair 408 is unused. Thus, in a secured fiber isolator system described herein, for each additional video data (i.e., video data that is in addition to the first video data 402 (also referred to as primary video)) that is output to the fiber isolator transmitter 104, the additional video data is received by a corresponding secure fiber isolator circuit 512. In some embodiments, each secure fiber isolator circuit 512 includes a respective EDID emulator, a respective data packetizer, and/or a respective fiber transceiver. In some embodiments, each fiber transceiver of the secure fiber isolator circuit 512 is coupled to a corresponding fiber-optic pair where a first optical fiber of the fiber-optic pair is used and a second optical fiber of the fiber-optic pair is not used. For example, as shown in FIG. 6, the optical fiber 608 of the second fiber-optic pair 614 is not used. In another example, a corresponding optical fiber of a corresponding fiber-optic pair 712, 714, 716 coupled to a transmit port of a corresponding fiber transceiver of the fiber isolator receiver 106 of FIG. 7 is not used.

Figure 7:
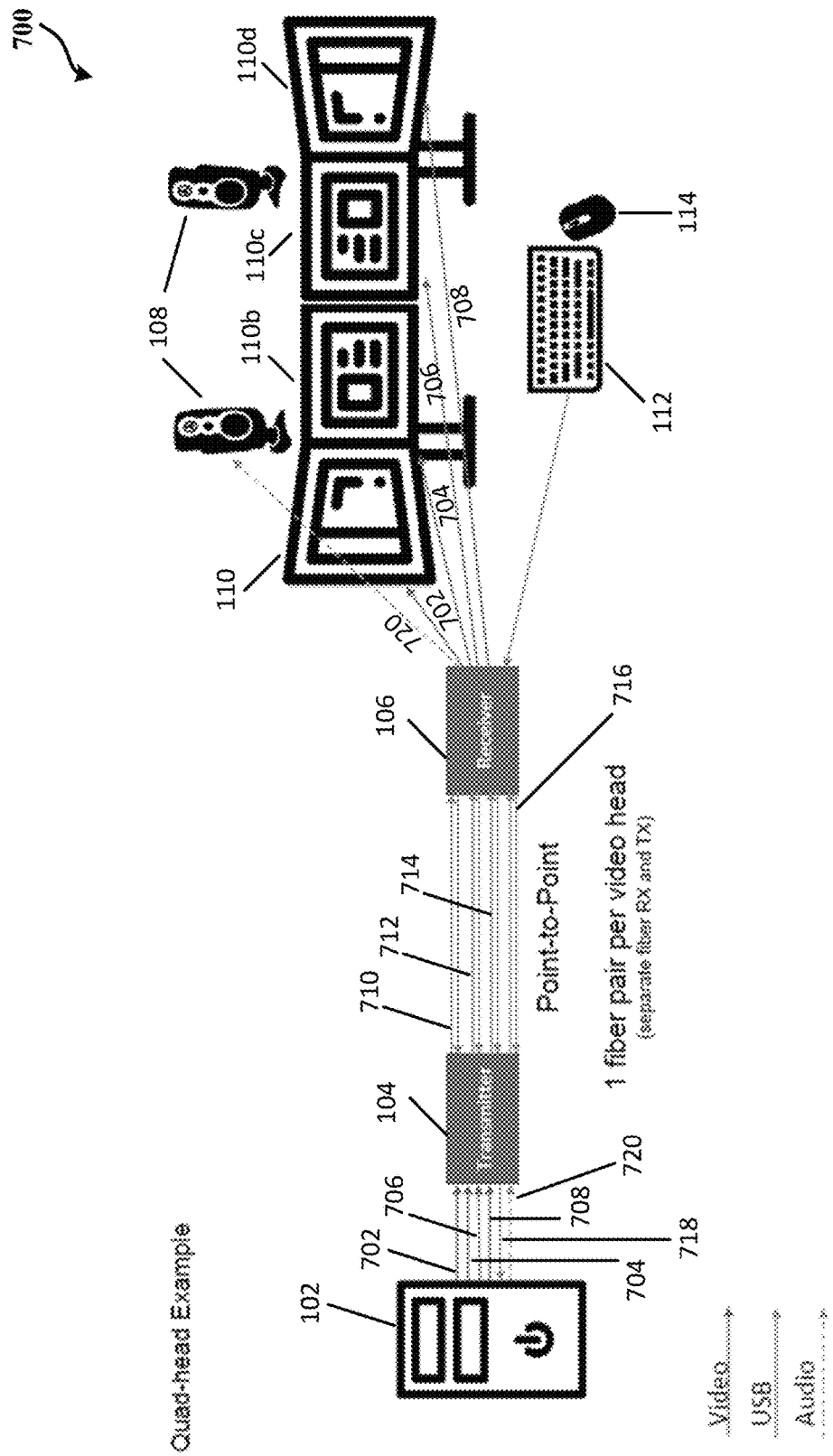
FIG. 7 illustrates a block diagram of an example system for a secured communication between a quad-head computer and one or more peripheral devices in accordance with some embodiments.

To illustrate, a quad-head secure fiber isolator system 700 is shown in FIG. 7. There are four video data 702, 704, 706, 708 that are output to the fiber isolator transmitter 104 from the computer 102. As further described below, for a secure isolation of communicated video data, there is a one-to-one correlation between 702-710-110; 704-712-110*b*; 706-714-110*c*; and 708-716-110*d* as illustrated in FIG. 7. The fiber isolator transmitter 104 outputs a first optical data signal corresponding to a first video data 702 to the fiber isolator receiver 106 via a first fiber-optic pair 710 to video display device 110. In some embodiments, audio data 720 is transferred between the fiber isolator transmitter 104 and the fiber isolator receiver 106 via the first fiber-optic pair 710. In some embodiments, USB data 718 may be transferred between the fiber isolator transmitter 104 and the fiber isolator receiver 106 via the first fiber-optic pair 710. In some embodiments, the fiber isolator transmitter 104 outputs a second optical data signal corresponding to a second video data 704 to the fiber isolator receiver 106 via a second fiber-optic pair 712 to video display device 110*b*. In some embodiments, the fiber isolator transmitter 104 outputs a third optical data signal corresponding to a third video data 706 to the fiber isolator receiver 106 via a third fiber-optic pair 714 to video display device 110*c*. In some embodiments, the fiber isolator transmitter 104 outputs a fourth optical data signal corresponding to a fourth video data 708 to the fiber isolator receiver 106 via a fourth fiber-optic pair 716 to video display device 110*d*. In such embodiments, the audio data 720 output from the computer 102 is transferred over a particular fiber-optic pair. USB data 718 is transmitted from fiber isolator receiver 106 to fiber isolator transmitter 104 over a particular fiber-optic pair. The particular fiber-optic pairs may be one of the first fiber-optic pair 710, the second fiber-optic pair 712, the third fiber-optic pair 714, and the fourth fiber-optic pair 716. In some embodiments, each subsequent video data from the computer 102 is output by the fiber isolator transmitter 104 via a corresponding EDID emulator coupled to a corresponding data packetizer coupled to a corresponding fiber transceiver of the fiber isolator transmitter 104.

In some embodiments, the fiber isolator transmitter 104 includes a secure system monitoring processor 216, a log system 218, and/or a data and chassis monitoring 220. The secure system monitoring processor 216 is coupled to the log system 218 and/or the data and chassis monitoring 220. In some embodiments, the secure system monitoring processor 216 is coupled to and/or monitors each EDID emulator, each data packetizer, and/or each fiber transceiver of the fiber isolator transmitter 104 as exemplified in FIG. 5.

The fiber isolator receiver 106 of the dual-head secure fiber isolator system 400 is shown in FIG. 6. The optical data signal corresponding to the first video data 402 and/or the audio data 122 is received by the fiber isolator receiver 106 via a first optical fiber 602 of a first fiber-optic pair 612. The second optical data signal corresponding to the second video data 406 is received by the fiber isolator receiver 106 via a second optical fiber 606 of a second fiber-optic pair 614. In some embodiments, the third optical data signal corresponding to the USB data 120 is output by the fiber isolator receiver 106 to the fiber isolator transmitter 104 via a third optical fiber 604 of the first fiber-optic pair 612. In some embodiments, a fourth optical fiber 608 of the second fiber-optic pair 614 is not used. As can be seen in FIG. 6, an additional video data received by the fiber isolator receiver 106 is received by a corresponding secure fiber isolator circuit 610. In some embodiments, the secure fiber isolator circuit 610 of the fiber isolator receiver 106 includes a corresponding EDID emulator coupled to a corresponding data packetizer coupled to a respective fiber transceiver. For example, the fiber isolator receiver 106 of FIG. 7 may include three secure fiber isolator circuits 610. Each of the three secure fiber isolator circuits 610 may receive a corresponding optical data signal corresponding to a video data 704, 706, 708. In some embodiments, each fiber transceiver of a secure fiber isolator circuit 610 is coupled to a corresponding fiber-optic pair where a first optical fiber of the fiber-optic pair is used and the second optical fiber of the fiber-optic pair is not used.

Figure 8:
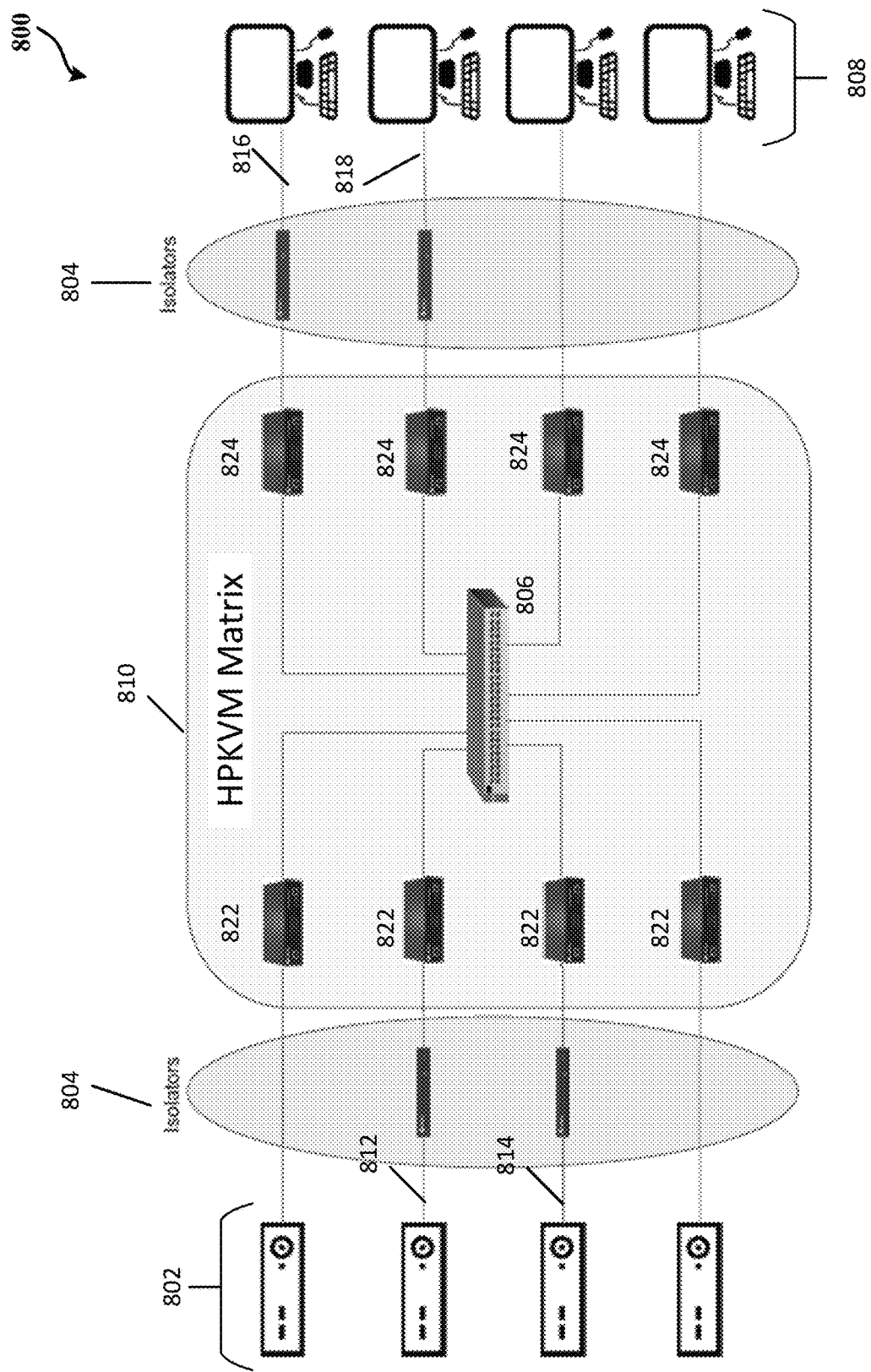
FIG. 8 illustrates a block diagram of existing/conventional KVM isolators.

To describe the advantages/improvements of the fiber isolator systems described herein as compared to existing/conventional KVM isolators, FIG. 8 is shown. FIG. 8 illustrates a block diagram of existing/conventional KVM isolators 800. The existing/conventional KVM isolators 800 include a plurality of computers 802 (e.g., servers, desktops, etc.), a plurality of KVM isolators 804, and a plurality of peripheral devices 808 coupled to one another via a switch network (e.g., ethernet switch). The switch network may correspond to a high performance KVM (HPKVM) system 810 and is not viewed as secure because it uses an Ethernet switch and does not enforce unidirectional communication. On the contrary, the fiber isolator systems described herein use dedicated fiber cables to connect one transmitter to one receiver and enforce unidirectional communication (i.e., one fiber cable for video and audio going from computer to display/speakers and a second and separate fiber for USB from keyboard/mouse to computer). As such, the KVM isolators 804 on either side of the "HPKVM Matrix" 810 are the same device. Each KVM isolator 804 has keyboard, video, and mouse connections on the input and output sides of the KVM isolator 804. In contrast, the fiber isolator systems of the present disclosure (FIGS. 1, 4, 7, and 9) have the keyboard, video, and mouse on one side and fiber optic cable on the other.

One or more computers of the plurality of computers 802 are coupled to a respective one of the plurality of KVM isolators 804 which are coupled to a respective one of the plurality of HPKVM transmitters 822 (e.g., 812, 814). One or more sets of peripheral devices of the plurality of peripheral devices 808 are coupled to a respective one of the plurality of KVM isolators 804 which are coupled to a respective one of the plurality of HPKVM receivers 824 (e.g., 816, 818). HPKVM transmitters 822 and HPKVM receivers 824 are connected to an Ethernet switch 806.

Figure 9:
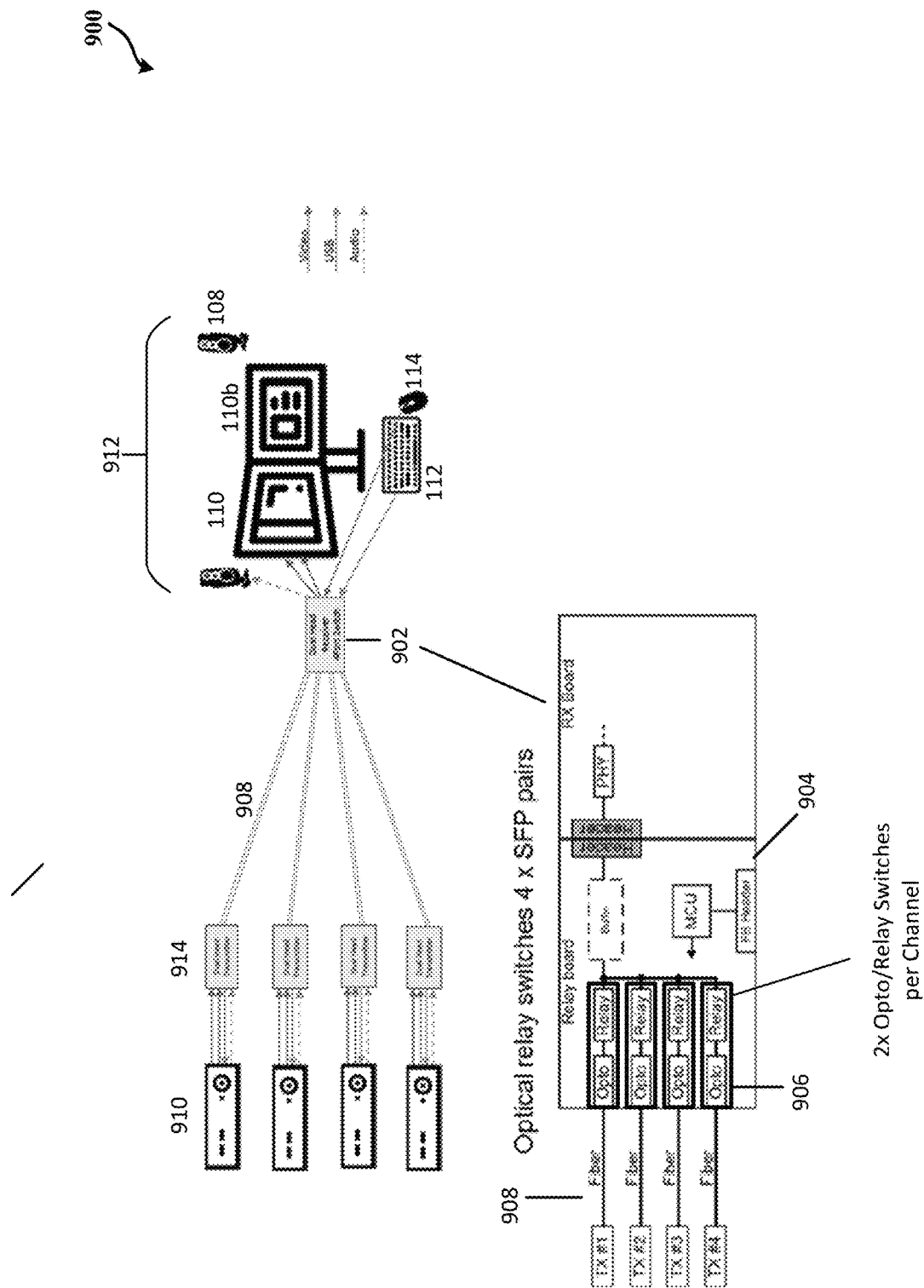
FIG. 9 illustrates a block diagram of an example system for a secured communication between multiple dual-head computers and one or more peripheral devices in accordance with some embodiments.

FIG. 9 illustrates a block diagram of an example system 900 for a secured communication between a plurality of fiber isolators 914 and one or more peripheral devices 912 in accordance with some embodiments. For example, each of the plurality of fiber isolator transmitters 914 may correspond to the dual head fiber isolator transmitter 104 of FIG. 4. In some embodiments, the system 900 includes a dual head fiber isolator receiver 902. In some embodiments, the dual head fiber isolator receiver 902 includes a relay board 904 having a plurality of opto/relay switches 906. Each of the plurality of opto/relay switches 906 may be coupled to a corresponding fiber-optic pair 908. By one approach, there are two opto/relay switches per fiber-optic pair (or channel). By another approach, multiple opto/relay switches may be paired with each dual head fiber isolator transmitter 914. In some embodiments, an opto/relay switch of the plurality of opto/relay switches 906 is activated one at a time upon a receipt of a user selection. This system enables a single set of peripheral devices 912 to select between one in a plurality of fiber isolator transmitters 914, thus providing a secure KVM switch with fiber isolation between each of a plurality of computers 910. In some embodiments, the one or more peripheral devices 912 include a set of speakers 108, display devices 110 and/or 110*b* (e.g., a monitor and/or any electronic device capable of displaying video stream and/or images), computer mouse 114, and/or keyboard 112. Each of the plurality of fiber-optic pairs 908 may connect to a dual-head fiber isolator transmitter 914. In some embodiments, a single-head fiber isolator transmitter may utilize only one of the fiber-optic pairs 908. Moreover, FIG. 9 shows 4 sets of 2 fiber pairs each coupled to a respective one of a plurality of fiber isolator transmitters 914. The first fiber pair in each set has one fiber for keyboard and/or mouse going from the dual head fiber isolator receiver 902 to one of a plurality of fiber isolator transmitters 914 and the second fiber sends video and/or audio from one computer in a plurality of computers 910 to the dual head fiber isolator receiver 902. The second fiber pair in each set of fiber pairs only uses one of the fibers to send video from the same computer in a plurality of computers 910 to the dual head fiber isolator receiver 902. In some embodiments, the sets of fiber pairs are switched together via the relay board 904. In such embodiments, a video from one computer at a time may be selected.

Figure 10:
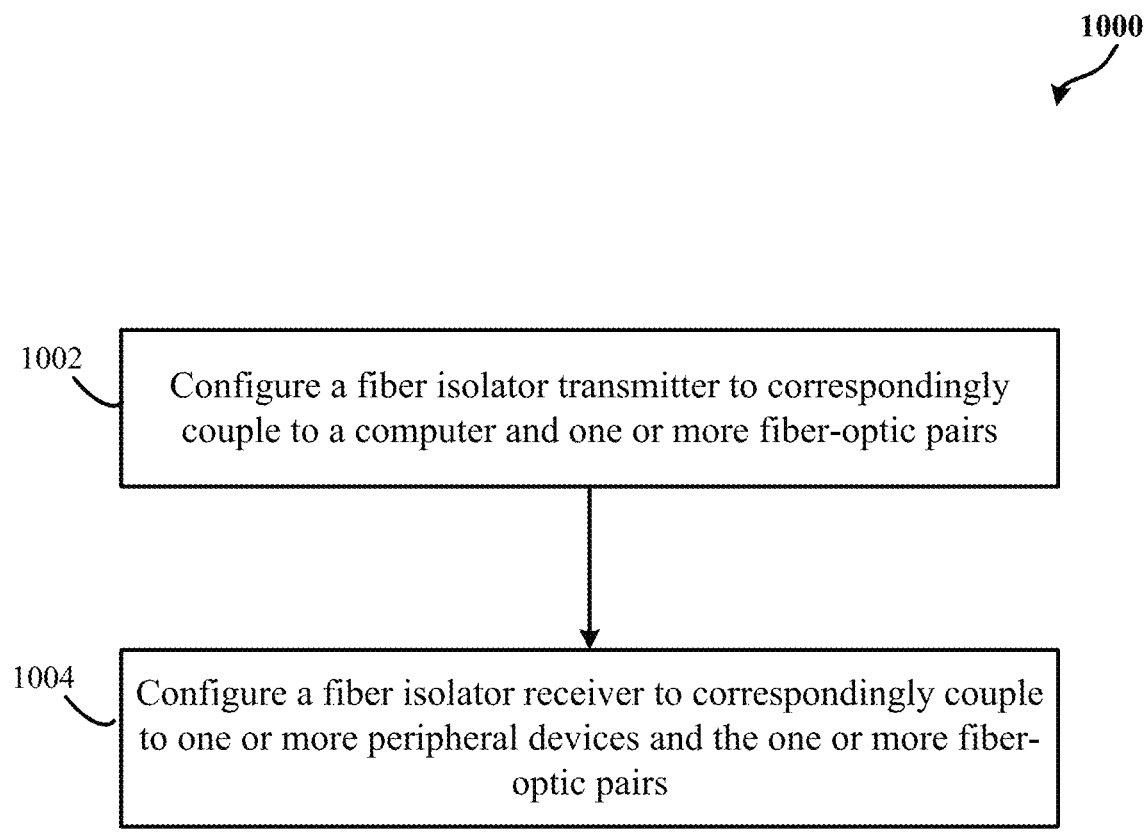
FIG. 10 shows a flow diagram of an exemplary method of securing communication between a computer and one or more peripheral devices in accordance with some embodiments.

FIG. 10 shows a flow diagram of an exemplary method 1000 of securing communication between a computer and one or more peripheral devices in accordance with some embodiments. The method 1000 includes configuring, at step 1002, a fiber isolator transmitter to correspondingly couple to a computer and one or more fiber-optic pairs. In some embodiments, the method 1000 includes configuring, at step 1004, a fiber isolator receiver to correspondingly couple to one or more peripheral devices and the one or more fiber-optic pairs. In some embodiments, the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs.

A system for a secured communication between a computer and peripheral devices comprising: a fiber isolator transmitter correspondingly coupled to a computer and one or more fiber-optic pairs; a fiber isolator receiver correspondingly coupled to one or more peripheral devices and the one or more fiber-optic pairs; and the one or more fiber-optic pairs configured to transfer optical data signals between the fiber isolator transmitter and the fiber isolator receiver, wherein the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs.

The system of any preceding clause wherein a first optical data signal associated with a universal serial bus (USB) data and an audio data are transferred between the fiber isolator transmitter and the fiber isolator receiver via a particular fiber optic pair of the one or more fiber-optic pairs, and wherein each of the one or more fiber-optic pairs are configured to transfer video data.

The system of any preceding clause wherein the one or more peripheral devices comprise a computer mouse, a display device, a keyboard, and an audio speaker.

The system of any preceding clause wherein the fiber isolator transmitter comprises: an extended display identification data (EDID) emulator configured to receive a video data from the computer and output the video data to a data packetizer; an audio serializer configured to receive analog audio data from the computer and output a serialized audio data to the data packetizer; the data packetizer configured to: receive the video data and the serialized audio data; transform the video data and the serialized audio data into corresponding electronic data packets; and output the corresponding electronic data packets associated with the video data and the serialized audio data to a fiber transceiver; and the fiber transceiver configured to: receive and convert the corresponding electronic data packets into an optical data signal; and output the optical data signal to a first optical fiber of a fiber-optic pair.

The system of any preceding clause wherein the fiber isolator transmitter further comprises a universal serial bus (USB) emulator configured to receive a USB data from the data packetizer and output an emulated USB data to the computer; wherein the data packetizer is further configured to receive and transform a second corresponding electronic data packet into the USB data and output the USB data to the USB emulator, and wherein the fiber transceiver is further configured to receive and convert a second optical data signal into the second corresponding electronic data packet and output the second corresponding electronic data packet to the data packetizer.

The system of any preceding clause wherein the fiber isolator transmitter further comprises: a second EDID emulator configured to receive a second video data from the computer and output the second video data to a second data packetizer; the second data packetizer configured to: receive and transform the second video data into a second corresponding electronic data packet; and output the second corresponding electronic data packet; and a second fiber transceiver configured to: receive and convert the second corresponding electronic data packet into a second optical data signal; and output the second optical data signal to a second optical fiber of a second fiber-optic pair, wherein a third optical fiber of the second fiber-optic pair is not used.

The system of any preceding clause wherein each subsequent video data from the computer is output by the fiber isolator transmitter via a corresponding EDID emulator coupled to a corresponding data packetizer coupled to a corresponding fiber transceiver of the fiber isolator transmitter.

The system of any preceding clause wherein the peripheral devices comprise a computer mouse, a display device, a keyboard, and an audio speaker.

The system of any preceding clause wherein the fiber isolator receiver comprises: a fiber transceiver configured to: receive an optical data signal from a first optical fiber of a fiber-optic pair; convert the optical data signal into corresponding electronic data packets; and output the corresponding electronic data packets to a data packetizer; the data packetizer configured to: receive and transform the corresponding electronic data packets into video data and audio data; and output the video data and the audio data; an extended display identification data (EDID) emulator configured to receive the video data from the data packetizer and output the video data to the corresponding display device of the one or more peripheral devices; and an audio serializer configured to receive the audio data from the data packetizer and output a deserialized audio data to a set of speakers.

The system of any preceding clause wherein the fiber isolator receiver further comprises a universal serial bus (USB) emulator configured to receive USB data from at least one USB device of the one or more peripheral devices and output an emulated USB data to the data packetizer, wherein the data packetizer is further configured to receive and transform the emulated USB data into a second corresponding electronic data packet and output the second corresponding electronic data packet to the fiber transceiver, and wherein the fiber transceiver is further configured to convert the second corresponding electronic data packet into a second optical data signal and output the second optical data signal to a second optical fiber of the fiber-optic pair.

The system of any preceding clause wherein the fiber isolator receiver further comprises: a second fiber transceiver configured to: receive a third optical data signal from a third optical fiber of a second fiber-optic pair, wherein the third optical data signal comprises data corresponding to a second video data; convert the third optical data signal into a third corresponding electronic data packet; and output the third corresponding electronic data packet to a second data packetizer; the second data packetizer configured to: receive and transform the third corresponding electronic data packet into the second video data; and output the second video data to a second EDID emulator; and the second EDID emulator configured to receive the second video data from the second data packetizer and output the video data to a second corresponding display device of the one or more peripheral devices.

The system of any preceding clause wherein each subsequent display device receives a corresponding video data output by the fiber isolator receiver via a corresponding EDID emulator coupled to a corresponding data packetizer coupled to a corresponding fiber transceiver of the fiber isolator receiver.

A method for a secured communication between a computer and peripheral devices comprising: configuring a fiber isolator transmitter to correspondingly couple to a computer and one or more fiber-optic pairs; and configuring a fiber isolator receiver to correspondingly couple to one or more peripheral devices and the one or more fiber-optic pairs, wherein the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs.

The method of any preceding clause further comprising transferring a first optical data signal between the fiber isolator transmitter and the fiber isolator receiver via a particular fiber optic pair of the one or more fiber-optic pairs, wherein the first optical data signal is associated with universal serial bus (USB) data and audio data, and wherein each of the one or more fiber-optic pairs is configured to transfer video data.

The method of any preceding clause wherein the one or more peripheral devices comprise a computer mouse, a display device, a keyboard, and an audio speaker.

The method of any preceding clause further comprising: receiving, by an extended display identification data (EDID) emulator of the fiber isolator transmitter, a video data from the computer and output the video data to a data packetizer of the fiber isolator transmitter; receiving, by an audio serializer of the fiber isolator transmitter, analog audio data from the computer and outputting a serialized audio data to the data packetizer; receiving, by the data packetizer, the video data and the serialized audio data; transforming, by the data packetizer, the video data and the serialized audio data into corresponding electronic data packets; outputting, by the data packetizer, the corresponding electronic data packets associated with the video data and the serialized audio data to a fiber transceiver of the fiber isolator transmitter; receiving and converting, by the fiber transceiver, the corresponding electronic data packets into an optical data signal; and outputting, by the fiber transceiver, the optical data signal to a first optical fiber of a fiber-optic pair.

The method of any preceding clause further comprising: receiving, by a universal serial bus (USB) emulator of the fiber isolator transmitter, a USB data from the data packetizer and outputting an emulated USB data to the computer; receiving and transforming, by the data packetizer, a second corresponding electronic data packet into the USB data and outputting the USB data to the USB emulator; and receiving and converting, by the fiber transceiver, a second optical data signal into the second corresponding electronic data packet and outputting the second corresponding electronic data packet to the data packetizer.

The method of any preceding clause further comprising: receiving, by a fiber transceiver of the fiber isolator receiver, an optical data signal from a first optical fiber of a fiber-optic pair; converting, by the fiber transceiver, the optical data signal into corresponding electronic data packets and outputting the corresponding electronic data packets to a data packetizer of the fiber isolator receiver; receiving and transforming, by the data packetizer, the corresponding electronic data packets into video data and audio data; outputting, by the data packetizer, the video data and the audio data; receiving, by extended display identification data (EDID) emulator of the fiber isolator receiver, the video data from the data packetizer and outputting the video data to the corresponding display device of the one or more peripheral devices; receiving, by an audio serializer of the fiber isolator receiver, the audio data from the data packetizer and outputting a deserialized audio data to a set of speakers.

The method of any preceding clause further comprising: receiving, by a universal serial bus (USB) emulator of the fiber isolator receiver, USB data from at least one USB device of the one or more peripheral devices outputting an emulated USB data to the data packetizer; receiving and transforming, by the data packetizer, the emulated USB data into a second corresponding electronic data packet and outputting the second corresponding electronic data packet to the fiber transceiver; and converting, by the fiber transceiver, the second corresponding electronic data packet into a second optical data signal and outputting the second optical data signal to a second optical fiber of the fiber-optic pair.

The method of any preceding clause further comprising: receiving, by a second fiber transceiver of the fiber isolator receiver, a third optical data signal from a third optical fiber of a second fiber-optic pair, wherein the third optical data signal comprises data corresponding to a second video data; converting, by the second fiber transceiver, the third optical data signal into a third corresponding electronic data packet; and outputting, by the second fiber transceiver, the third corresponding electronic data packet to a second data packetizer of the fiber isolator receiver; receiving and transforming, by the second data packetizer, the third corresponding electronic data packet into the second video data; outputting, by the second data packetizer, the second video data to a second EDID emulator of the fiber isolator receiver; and receiving, by the second EDID emulator, the second video data from the second data packetizer and outputting the video data to a second corresponding display device of the one or more peripheral devices.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for a secured communication between a computer and peripheral devices comprising:
   a fiber isolator transmitter correspondingly coupled to a computer and one or more fiber- optic pairs;
   a fiber isolator receiver correspondingly coupled to one or more peripheral devices and the one or more fiber-optic pairs; and
   the one or more fiber-optic pairs configured to transfer optical data signals between the fiber isolator transmitter and the fiber isolator receiver, wherein the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs,
   wherein the fiber isolator transmitter comprises:
   an extended display identification data (EDID) emulator configured to receive a video data from the computer and output the video data to a data packetizer;

an audio serializer configured to receive analog audio data from the computer and output a serialized audio data to the data packetizer;

the data packetizer configured to:
receive the video data and the serialized audio data;
transform the video data and the serialized audio data into corresponding electronic data packets; and
output the corresponding electronic data packets associated with the video data and the serialized audio data to a fiber transceiver; and the fiber transceiver configured to:
receive and convert the corresponding electronic data packets into an optical data signal; and
output the optical data signal to a first optical fiber of a fiber-optic pair.

2. The system of claim 1, wherein a first optical data signal associated with a universal serial bus (USB) data and an audio data are transferred between the fiber isolator transmitter and the fiber isolator receiver via a particular fiber optic pair of the one or more fiber-optic pairs, and wherein each of the one or more fiber-optic pairs are configured to transfer video data.

3. The system of claim 1, wherein the one or more peripheral devices comprise a computer mouse, a display device, a keyboard, and an audio speaker.

4. The system of claim 1, wherein the fiber isolator transmitter further comprises a universal serial bus (USB) emulator configured to receive a USB data from the data packetizer and output an emulated USB data to the computer;
wherein the data packetizer is further configured to receive and transform a second corresponding electronic data packet into the USB data and output the USB data to the USB emulator, and
wherein the fiber transceiver is further configured to receive and convert a second optical data signal into the second corresponding electronic data packet and output the second corresponding electronic data packet to the data packetizer.

5. The system of claim 1, wherein the fiber isolator transmitter further comprises:
a second EDID emulator configured to receive a second video data from the computer and output the second video data to a second data packetizer;
the second data packetizer configured to:
receive and transform the second video data into a second corresponding electronic data packet; and
output the second corresponding electronic data packet; and
a second fiber transceiver configured to:
receive and convert the second corresponding electronic data packet into a second optical data signal; and
output the second optical data signal to a second optical fiber of a second fiber-optic pair, wherein a third optical fiber of the second fiber-optic pair is not used.

6. The system of claim 5, wherein each subsequent video data from the computer is output by the fiber isolator transmitter via a corresponding EDID emulator coupled to a corresponding data packetizer coupled to a corresponding fiber transceiver of the fiber isolator transmitter.

7. The system of claim 1, wherein the peripheral devices comprise a computer mouse, a display device, a keyboard, and an audio speaker.

8. A system for a secured communication between a computer and peripheral devices comprising:

a fiber isolator transmitter correspondingly coupled to the computer and one or more fiber-optic pairs;
a fiber isolator receiver correspondingly coupled to one or more peripheral devices and the one or more fiber-optic pairs; and
the one or more fiber-optic pairs configured to transfer optical data signals between the fiber isolator transmitter and the fiber isolator receiver, wherein the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs, wherein the fiber isolator receiver comprises:
a fiber transceiver configured to:
receive an optical data signal from a first optical fiber of a fiber-optic pair;
convert the optical data signal into corresponding electronic data packets; and
output the corresponding electronic data packets to a data packetizer;
the data packetizer configured to:
receive and transform the corresponding electronic data packets into video data and audio data; and
output the video data and the audio data;
an extended display identification data (EDID) emulator configured to receive the video data from the data packetizer and output the video data to the corresponding display device of the one or more peripheral devices; and
an audio serializer configured to receive the audio data from the data packetizer and output a deserialized audio data to a set of speakers.

9. The system of claim 8, wherein the fiber isolator receiver further comprises a universal serial bus (USB) emulator configured to receive USB data from at least one USB device of the one or more peripheral devices and output an emulated USB data to the data packetizer,
wherein the data packetizer is further configured to receive and transform the emulated USB data into a second corresponding electronic data packet and output the second corresponding electronic data packet to the fiber transceiver, and
wherein the fiber transceiver is further configured to convert the second corresponding electronic data packet into a second optical data signal and output the second optical data signal to a second optical fiber of the fiber-optic pair.

10. The system of claim 9, wherein the fiber isolator receiver further comprises:
a second fiber transceiver configured to:
receive a third optical data signal from a third optical fiber of a second fiber-optic pair, wherein the third optical data signal comprises data corresponding to a second video data;
convert the third optical data signal into a third corresponding electronic data packet; and
output the third corresponding electronic data packet to a second data packetizer;
the second data packetizer configured to:
receive and transform the third corresponding electronic data packet into the second video data; and
output the second video data to a second EDID emulator; and
the second EDID emulator configured to receive the second video data from the second data packetizer and output the video data to a second corresponding display device of the one or more peripheral devices.

11. The system of claim 10, wherein each subsequent display device receives a corresponding video data output by the fiber isolator receiver via a corresponding EDID emulator coupled to a corresponding data packetizer coupled to a corresponding fiber transceiver of the fiber isolator receiver.

12. A method for a secured communication between a computer and peripheral devices comprising:
configuring a fiber isolator transmitter to correspondingly couple to a computer and one or more fiber-optic pairs; and
configuring a fiber isolator receiver to correspondingly couple to one or more peripheral devices and the one or more fiber-optic pairs, wherein the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs;
receiving, by an extended display identification data (EDID) emulator of the fiber isolator transmitter, a video data from the computer and output the video data to a data packetizer of the fiber isolator transmitter;
receiving, by an audio serializer of the fiber isolator transmitter, analog audio data from the computer and outputting a serialized audio data to the data packetizer;
receiving, by the data packetizer, the video data and the serialized audio data;
transforming, by the data packetizer, the video data and the serialized audio data into corresponding electronic data packets;
outputting, by the data packetizer, the corresponding electronic data packets associated with the video data and the serialized audio data to a fiber transceiver of the fiber isolator transmitter;
receiving and converting, by the fiber transceiver, the corresponding electronic data packets into an optical data signal; and
outputting, by the fiber transceiver, the optical data signal to a first optical fiber of a fiber-optic pair.

13. The method of claim 12, further comprising transferring a first optical data signal between the fiber isolator transmitter and the fiber isolator receiver via a particular fiber optic pair of the one or more fiber-optic pairs, wherein the first optical data signal is associated with universal serial bus (USB) data and audio data, and wherein each of the one or more fiber-optic pairs is configured to transfer video data.

14. The method of claim 12, wherein the one or more peripheral devices comprise a computer mouse, a display device, a keyboard, and an audio speaker.

15. The method of claim 12, further comprising:
receiving, by a universal serial bus (USB) emulator of the fiber isolator transmitter, a USB data from the data packetizer and outputting an emulated USB data to the computer;
receiving and transforming, by the data packetizer, a second corresponding electronic data packet into the USB data and outputting the USB data to the USB emulator; and
receiving and converting, by the fiber transceiver, a second optical data signal into the second corresponding electronic data packet and outputting the second corresponding electronic data packet to the data packetizer.

16. A method for a secured communication between a computer and peripheral devices comprising:
configuring a fiber isolator transmitter to correspondingly couple to the computer and one or more fiber-optic pairs;
configuring a fiber isolator receiver to correspondingly couple to one or more peripheral devices and the one or more fiber-optic pairs, wherein the fiber isolator transmitter and the fiber isolator receiver are configured such that a corresponding video data flows from the computer to a corresponding display device of the one or more peripheral devices via an optical fiber of a corresponding fiber optic pair of the one or more fiber-optic pairs;
receiving, by a fiber transceiver of the fiber isolator receiver, an optical data signal from a first optical fiber of a fiber-optic pair;
converting, by the fiber transceiver, the optical data signal into corresponding electronic data packets and outputting the corresponding electronic data packets to a data packetizer of the fiber isolator receiver;
receiving and transforming, by the data packetizer, the corresponding electronic data packets into video data and audio data;
outputting, by the data packetizer, the video data and the audio data;
receiving, by an extended display identification data (EDID) emulator of the fiber isolator receiver, the video data from the data packetizer and outputting the video data to the corresponding display device of the one or more peripheral devices;
receiving, by an audio serializer of the fiber isolator receiver, the audio data from the data packetizer and outputting a deserialized audio data to a set of speakers.

17. The method of claim 16, further comprising:
receiving, by a universal serial bus (USB) emulator of the fiber isolator receiver, USB data from at least one USB device of the one or more peripheral devices outputting an emulated USB data to the data packetizer;
receiving and transforming, by the data packetizer, the emulated USB data into a second corresponding electronic data packet and outputting the second corresponding electronic data packet to the fiber transceiver; and
converting, by the fiber transceiver, the second corresponding electronic data packet into a second optical data signal and outputting the second optical data signal to a second optical fiber of the fiber-optic pair.

18. The method of claim 17, further comprising:
receiving, by a second fiber transceiver of the fiber isolator receiver, a third optical data signal from a third optical fiber of a second fiber-optic pair, wherein the third optical data signal comprises data corresponding to a second video data;
converting, by the second fiber transceiver, the third optical data signal into a third corresponding electronic data packet; and
outputting, by the second fiber transceiver, the third corresponding electronic data packet to a second data packetizer of the fiber isolator receiver;
receiving and transforming, by the second data packetizer, the third corresponding electronic data packet into the second video data;
outputting, by the second data packetizer, the second video data to a second EDID emulator of the fiber isolator receiver; and receiving, by the second EDID emulator, the second video data from the second data packetizer and outputting the video data to a second corresponding display device of the one or more peripheral devices.

\* \* \* \* \*